United States Patent
Morita et al.

(10) Patent No.: US 7,770,486 B2
(45) Date of Patent: Aug. 10, 2010

(54) GEARSHIFT DEVICE AND METHOD OF CONTROLLING SAME

(75) Inventors: Akio Morita, Wako (JP); Yasushi Ohkawa, Wako (JP); Yoshiharu Saito, Wako (JP); Tomohiro Sakuraba, Wako (JP); Atsushi Komatsu, Wako (JP); Kotaro Hiramine, Wako (JP); Shusaku Noguchi, Wako (JP); Yoshinori Furusawa, Wako (JP); Makirou Ishimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1045 days.

(21) Appl. No.: 11/216,344

(22) Filed: Aug. 31, 2005

(65) Prior Publication Data

US 2006/0053930 A1    Mar. 16, 2006

(30) Foreign Application Priority Data

Sep. 2, 2004    (JP)    ............................. 2004-255199

(51) Int. Cl.
   *B60K 20/00*    (2006.01)
   *G05G 9/00*    (2006.01)
(52) U.S. Cl. .................................. 74/473.18; 74/473.1
(58) Field of Classification Search .............. 74/473.18, 74/473.21, 473.1
   See application file for complete search history.

(56) References Cited

U.S. PATENT DOCUMENTS

| | | | |
|---|---|---|---|
| 5,207,740 A * | 5/1993 | Ikushima et al. ......... | 192/220.6 |
| 5,919,112 A | 7/1999 | Michael et al. | |
| 6,895,833 B2 * | 5/2005 | Cho ......................... | 74/473.18 |
| 7,028,575 B2 | 4/2006 | Ehrmaier et al. | |
| 7,107,868 B2 * | 9/2006 | Yone ........................... | 74/335 |
| 2002/0055410 A1 * | 5/2002 | Nagasaka ..................... | 477/94 |
| 2004/0237693 A1 * | 12/2004 | Koide ....................... | 74/473.18 |

FOREIGN PATENT DOCUMENTS

| | | |
|---|---|---|
| DE | 4419212 | 12/1995 |
| DE | 19625019 | 1/1998 |
| DE | 19849076 | 4/2000 |
| DE | 10206985 | 8/2003 |
| DE | 10231518 | 2/2004 |
| JP | 07-052676 | 2/1995 |
| JP | 08-142699 | 6/1996 |
| JP | 2002-254942 | 9/2002 |
| JP | 2003-327002 | 11/2003 |

* cited by examiner

*Primary Examiner*—Thomas R Hannon
*Assistant Examiner*—James Pilkington
(74) *Attorney, Agent, or Firm*—Rankin, Hill & Clark LLP

(57) ABSTRACT

In an automatic transmission, a shift lever is operable to move to one of a plurality of shift positions corresponding to ranges established as selectable options. The plurality of shift positions are each configured as one of a momentary position allowing the shift lever to automatically return to a home position and a retention position allowing the shift lever to be held therein. A return mechanism for causing the shift lever held in the retention position to return to the home position is provided. The return mechanism is enabled on one of conditions that the parking switch be turned on and that an ignition switch be turned off. In a manual transmission, a return mechanism for causing the shift lever held in a gear stage to return to a home position is provided, and the return mechanism is enabled on condition that an ignition switch be turned off.

10 Claims, 4 Drawing Sheets

AUTOMATIC MODE

MANUAL MODE

GEARSHIFT DEVICE AND METHOD OF CONTROLLING SAME

BACKGROUND OF THE INVENTION

This invention relates to a gearshift device for a system for transmission of power in a motor vehicle, and a method of controlling the same.

Among various types of gearshift devices for an automated speed changing mechanism or automatic transmission (gearbox) provided in a vehicle, those which adopt so-called "Shift By Wire" scheme have been attracting attention in recent years as carrying advantages in downsizing of the device and reduction in the force required for operation thereof. JP 2002-254942 A (see Paragraphs 0020-0029, FIG. 2) and JP2003-327002 (see Paragraphs 0013-0017, FIG. 2) disclose exemplary implementations of such "Shift By Wire" type gearshift devices. The gearshift device adopting the "Shift By Wire" scheme is, in general, configured to switch gears in the automatic transmission using an actuator, based upon the position of a shift lever detected using a sensor or the like; that is, the gears of the automatic transmission are changed under electronic control. This configuration enhances the flexibility in design which determines the manner of manipulation of the shift lever. For example, the "momentary" actuation of a gear can be realized such that the shift lever, once placed in a specific gear and then released, is automatically returned to a home position.

Typically, the automatic transmission allows options of gear ranges: neutral, drive, reverse and low. Note that "parking" range, which could be deemed to be an option, is directed to lock the automatic transmission, and thus distinct from the aforementioned options of the gear ranges. The shift positions of the shift lever are indicated as "neutral", "drive", "reverse" and "low" in positions corresponding to these gear ranges. In the gearshift devices adopting the "Shift By Wire" scheme, the aforementioned "momentary" actuation can be enabled for every shift position, which keeps the shift lever in a predetermined (home) position at all times but when the shift lever is being manipulated, to ensure increased ease of gearshift operation.

On the other hand, however, keeping the shift position in a predetermined position would disadvantageously deprive the driver of a clue for recognizing which range is the current state of the automatic transmission. This could be most serious in situations which require frequent changes in shift position, such as: those which require repeated forward and backward operations of the vehicle as you may encounter in parallel parking, and those which require changes between low and drive ranges during driving the vehicle as you may encounter in taking a road through the hills. It has been previously proposed to provide a light-emitting indicator on the instrument panel or the like, to indicate symbols representative of the range of gears currently actuated, (for example, "R" for reverse gear range, and "L" for low gear range). The problem associated with this indicator, however, is that the driver is obliged to take his/her eyes off the outside of the vehicle to check up on the indication on the instrument panel.

To address the problem, assuming for example that the "momentary" actuation is disabled for the reverse and low positions with the shift lever kept in these shift positions without returning to the home position, the driver can recognize at least the low or reverse range as the currently actuated gear range by the position of the hand that grips the shift lever, so that the driver can swiftly make a decision as to manipulation of the shift lever in parallel parking of the vehicle or driving through the hills. Accordingly, by providing the shift lever with a retention property for the reverse and low positions while providing the same shift lever with a momentary actuation property for the positions frequently used during normal operations such as the drive position for normal driving operation and the neutral position used when the vehicle is to be at a stop, an excellent gearshift device with gearshift operation facilitated considerably can be realized.

However, if the shift lever is provided with such a retention property as described above, inconsistencies may take place such that when the driver gets off the vehicle, the status of the transmission is switched to the parking range though the shift lever remains in the reverse position. In this instance, on the next occasion when the driver gets on the vehicle, the driver is undesirably obliged to manually move the shift lever back to the home position before anything else.

The present invention has been made in an attempt to eliminate the aforementioned disadvantages, and it is one aspect of the present invention to provide a gearshift device and a method of controlling the same, which can achieve an improved gearshift operation in view of the problems discussed above.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to provide a gearshift device including a shift lever operable to move to one of a plurality of shift positions corresponding to a plurality of ranges established as selectable options in an automatic transmission, a parking switch, and a return mechanism for causing the shift lever held in the retention position to return to the home position. The plurality of shift positions are each configured as one of a momentary position and a retention position. The momentary position is adapted to allow the shift lever to automatically return to a home position. The retention position is adapted to allow the shift lever to be held therein. The parking switch is adapted to allow an option of a parking range. The return mechanism is enabled on one of conditions that the parking switch be turned on and that an ignition switch be turned off.

With the gearshift device defined above, even if a driver gets off a vehicle with the shift lever left in the retention position, when the driver gets on the vehicle later, he/she will see the shift lever back in the home position. Therefore, the driver will turn the ignition key on without special consideration given to the shift position of the shift lever.

In the above gearshift device, the plurality of shift positions may include a reverse position corresponding to a reverse range and a low position corresponding to a low range, and at least one of the reverse position and the low position may be configured as the retention position. In this exemplary embodiment, the driver may easily recognize the current gear range as being the reverse range or the low range from the sensory feeling of his/her hand. Accordingly, the driver can make a quick and timely decision as to the manipulation of the shift lever during parallel parking of the vehicle or driving through the hills.

In the above gearshift device, alternatively, the plurality of shift positions may include a neutral position corresponding to a neutral range, a drive position corresponding to a drive range, a reverse position corresponding to a reverse range and a low position corresponding to a low range, whereas the neutral position and the drive position are each configured as the momentary position, and the reverse position and the low position are each configured as the retention position. In this embodiment, the neutral position and the drive position are located on a straight path of the shift lever on which the home position is located between the neutral position and the drive position, and the reverse position and the low position are located off the straight path. According to this exemplary embodiment, the gearshift operation for shifting between the most frequently used neutral and drive positions can be carried out straightforward, and thus the gearshift operation is facilitated. Further, since the home position is located between these frequently used positions, the both positions can be recognized with increased ease. Moreover, since the less frequently used reverse and low positions in comparison with the neutral and drive positions are configured as the retention position and located off the straight path between the neutral and the drive positions, the driver can easily recognize the reverse and low positions through the sensory feeling of his/her hand.

In those embodiments of gearshift device described above, the return mechanism may preferably but not necessarily be adapted to start to cause the shift lever held in the retention position to return to the home position at a time of expiration of a predetermined period after the return mechanism is enabled. Alternatively or additionally, the return mechanism may be adapted to start to cause the shift lever held in the retention position to return to the home position at a time of occurrence of a predetermined operation to the vehicle after the return mechanism is enabled. According to these embodiments, the following disadvantages can be overcome. Assuming that the shift lever held in the retention position is caused to return to the home position immediately upon turning on of the parking switch or turning off of the ignition switch, there may be some who would feel somewhat unexpected with such immediate return motion of the shift lever. Moreover, in cases where the parking switch and/or the ignition switch are arranged in positions near the shift lever, or where the parking switch is provided on the shift lever itself, the immediately returning shift lever could likely interfere with the hand operating the parking switch or the ignition switch. To address these disadvantages, the gearshift device according to these embodiments may furnish solutions thereto as the return motion of the shift lever takes place at a time shifted from the time when the parking switch or the ignition switch is operated. As a result, the problems of unexpected feeling of the driver and interference of the returning shift lever with the operating driver's hand as described above can be eliminated.

The above predetermined operation to the vehicle may, for example, include at least one of opening and closing of a door at a driver's seat.

The above return mechanism may, for example, include a solenoid.

The above plurality of shift positions may include a mode switch position. In one embodiment, the mode switch position is adapted to allow an option to change an operation mode between an automatic mode and a manual mode, whereas the mode switch position is configured as the momentary position. Further, the neutral and drive positions in the automatic mode corresponding to the neutral and drive ranges respectively may be adapted to serve as up-stage and down-stage positions in the manual mode. Furthermore, display units may be provided near the neutral and drive positions respectively to show functions of respective positions varying in accordance with the operation mode.

According to another aspect of the present invention, there is provided a gearshift device for a transmission with manual speed changing functionality. The gearshift device includes: a shift lever; a return mechanism for causing the shift lever held in a gear stage to return to a home position, the return mechanism being enabled on condition that an ignition switch be turned off.

With the gearshift device defined above, even if a driver gets off a vehicle with the shift lever held in a gear stage, when the driver turns the ignition switch on later, he/she will see the shift lever is in the home position, and thus, the driver's mind will not be bound to run on the shift position of the shift lever.

In this gearshift device, the return mechanism may preferably but not necessarily be adapted to start to cause the shift lever held in the gear stage to return to the home position at a time of expiration of a predetermined period after the return mechanism is enabled. Alternatively of additionally, the return mechanism may be adapted to start to cause the shift lever held in the gear stage to return to the home position at a time of occurrence of a predetermined operation to the vehicle after the return mechanism is enabled. According to these exemplary embodiments, the following disadvantages can be overcome. Assuming that the shift lever held in the gear stage is caused to return to the home position immediately upon turning off of the ignition switch, there may be some who would feel somewhat unexpected with such immediate return motion of the shift lever. Moreover, in a case where the ignition switch is arranged in a position near the shift lever, the immediately returning shift lever could likely interfere with the hand operating the ignition switch. To address these disadvantages, the gearshift device according to these embodiments may furnish solutions thereto as the return motion of the shift lever takes place at a time shifted from the time when the ignition switch is operated. As a result, the problems of unexpected feeling of the driver and interference of the returning shift lever with the operating driver's hand as described above can be eliminated.

According to yet another aspect of the present invention, there is provided a method of controlling a gearshift device with a shift lever operable to move to one of a plurality of shift positions corresponding to a plurality of ranges established as selectable options in an automatic transmission. In this method, the plurality of shift positions are each configured as one of a first type and a second type. The method comprises: allowing the shift lever to automatically return from a shift position of the first type to a home position; allowing the shift lever to be held in a shift position of the second type; making a determination that the shift lever held in the shift position of the second type is to return to the home position, if one of the following conditions is satisfied: (1) a parking switch allowing an option of a parking range be turned on; and (2) an ignition switch be turned off; and causing the shift lever held in the shift position of the second type to return to the home position.

With the method defined above, even if a driver gets off a vehicle with the shift lever left in the shift position of the second type (the shift lever would otherwise be continuously held in that position), when the driver gets on the vehicle later, he/she will see the shift lever is in the home position. Therefore, the driver will turn the ignition switch on without special consideration directed to the shift position of the shift lever.

In this method, preferably but not necessarily, the shift lever held in the shift position of the second type may be caused to return to the home position at a time of expiration of a predetermined period after the determination is made; alternatively or additionally, the shift lever held in the shift position of the second type may be caused to return to the home position at a time of occurrence of a predetermined operation to the vehicle after the determination is made.

According to yet another aspect of the present invention, there is provided a method of controlling a gearshift device for a transmission with manual speed changing functionality. This method comprising causing a shift lever held in a gear stage to return to a home position on condition that an ignition switch be turned off.

With the method defined above, even if a driver gets off a vehicle with the shift lever held in a gear stage, when the driver turns the ignition key on later, he/she will see the shift lever is in the home position, and thus, the driver's mind will not be bound to run on the shift position of the shift lever.

In this method, preferably but not necessarily, the shift lever held in the gear stage may be caused to return to the home position at a time of expiration of a predetermined period after the ignition switch be turned off; alternatively or additionally the shift lever held in the gear stage may be caused to return to the home position at a time of occurrence of a predetermined operation to the vehicle after the ignition switch be turned off.

BRIEF DESCRIPTION OF THE DRAWINGS

The above aspects, other advantages and further features of the present invention will become more apparent by describing in detail illustrative, non-limiting embodiments thereof with reference to the accompanying drawings, in which:

FIG. 5A shows an automatic mode and FIG. 5B shows a manual mode.

DETAILED DESCRIPTION OF THE EXEMPLARY EMBODIMENTS

Figure 1:
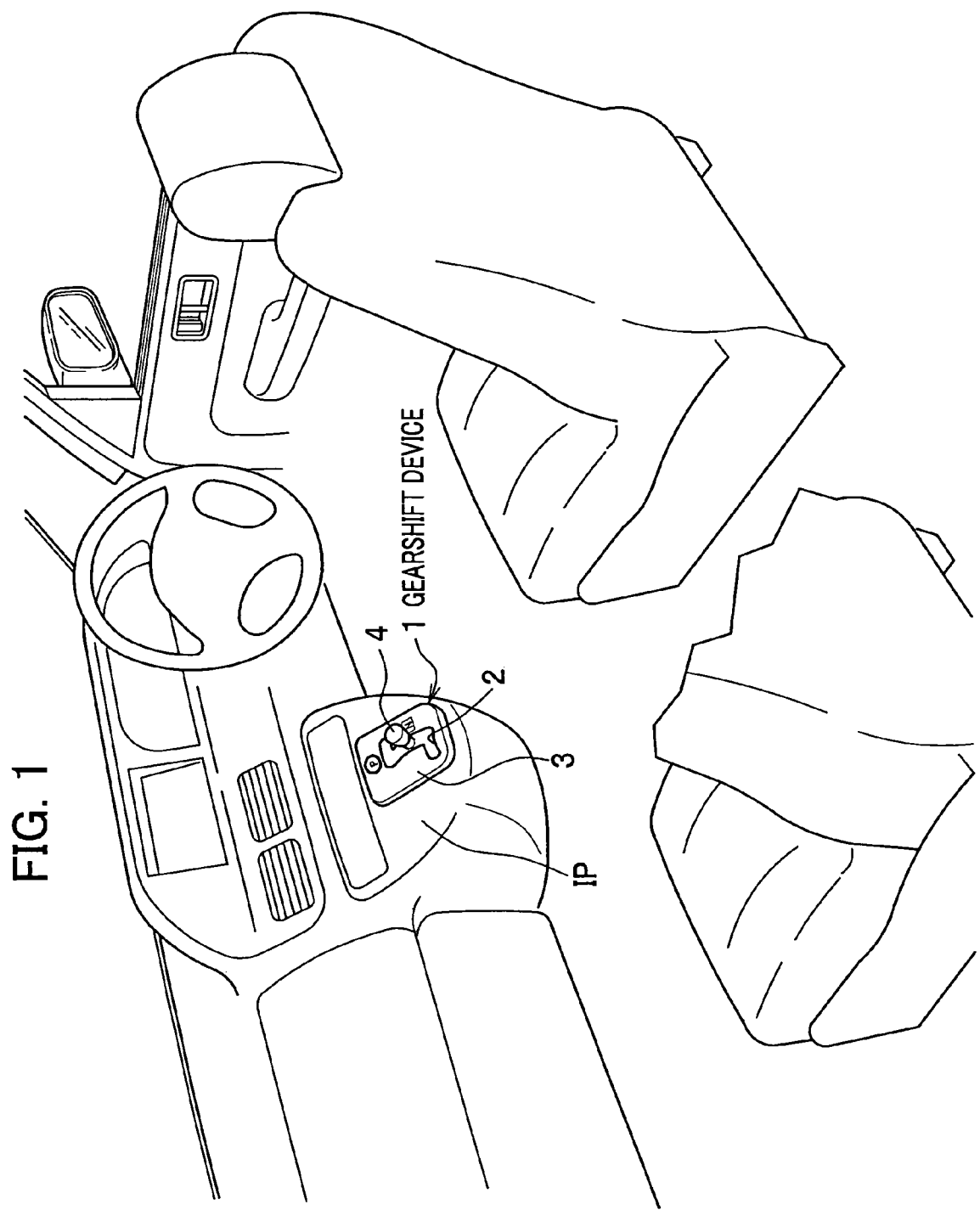
FIG. 1 is an external view, in perspective, of an interior of a vehicle cabin around an instrument panel in which is provided a gearshift device for an automatic transmission.
Figure 2:
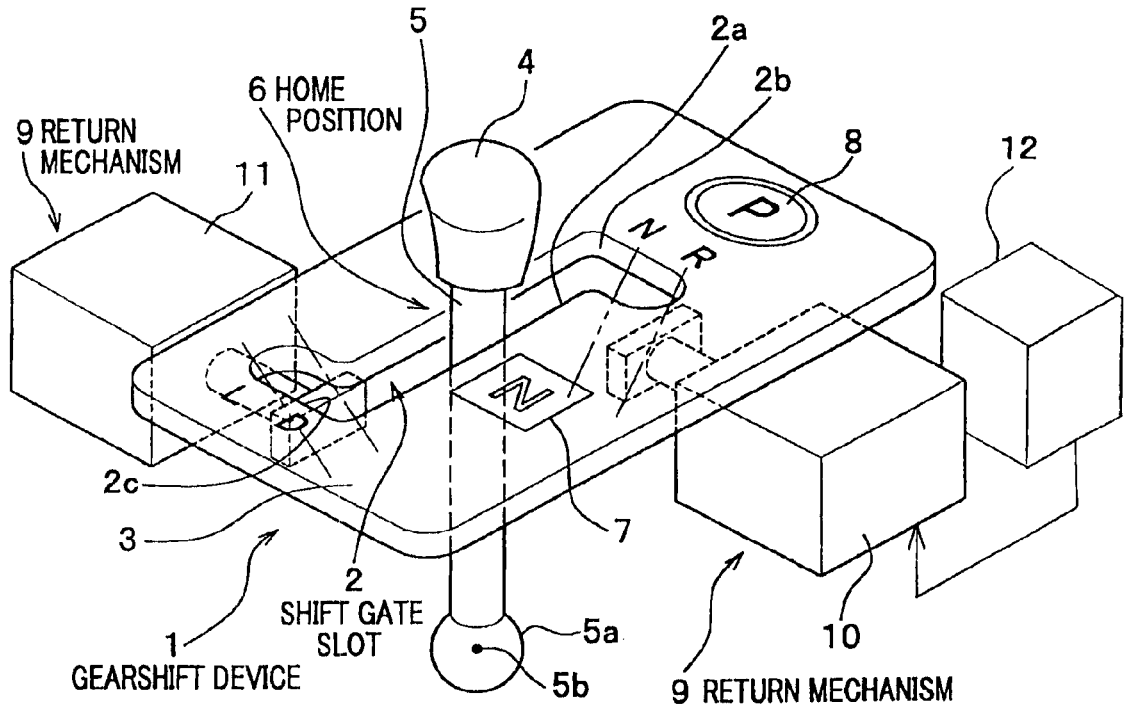
FIG. 2 is a phantom view, in perspective, of a gearshift device for an automatic transmission.
Figure 3:
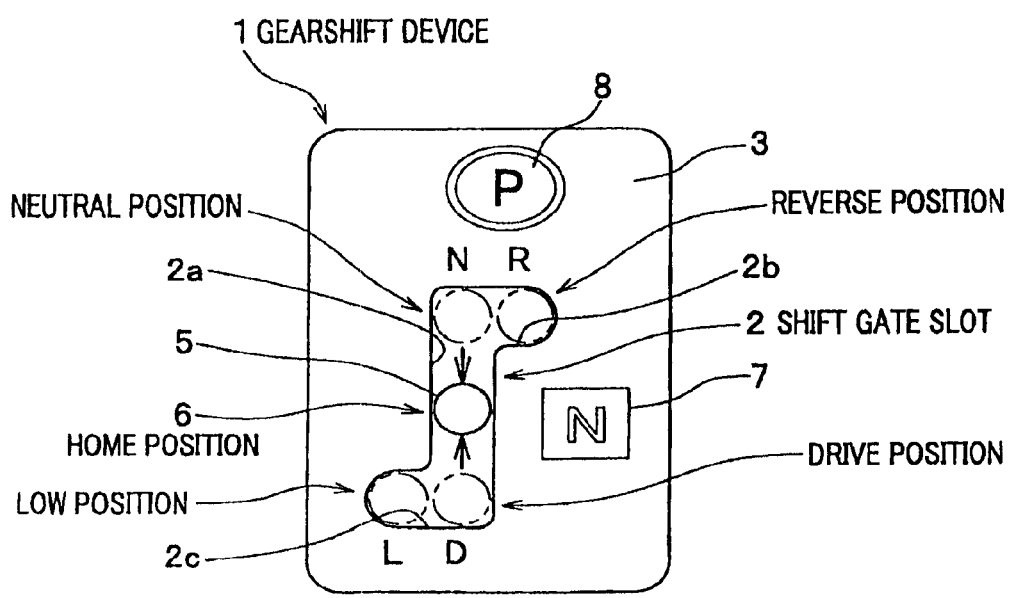
FIG. 3 is a diagrammatic plan view of the gearshift device shown in FIG. 2.

A description will be given of exemplary embodiments of the present invention with reference to the drawings. Referring now to FIGS. 1 through 3, a gearshift device 1 according to one embodiment of the present invention is illustrated which is a gearshift device for an automatic transmission or gearbox (not shown) operated with the "Shift By Wire" scheme. As shown in FIG. 1, the gearshift device 1 is mounted in an instrument panel IP provided for example between the driver's seat and a passenger seat next to the driver's seat. In this embodiment, a shift gate slot 2 is provided in an escutcheon cover 3 attached to the instrument panel IP; however, the shift gate slot 2 may be provided directly in the instrument panel IP.

As shown in FIG. 2, a shift lever 5 having a shift knob 4 attached at its upper end is inserted in the shift gate slot 2. At a lower end of the shift lever 5 is provided a spherical pivot ball portion 5, which is supported by a spherical bearing (not shown) in a manner that permits the shift lever 5 to pivot three-dimensionally about a pivot center 5b. The shift gate slot 2 includes a first gate slot 2a, a second gate slot 2b and a third gate slot 2c. The first gate slot 2a extends in a front/rear direction of the vehicle. The second gate slot 2b extends from a front end of the first gate slot 2a in one direction perpendicular to the first gate slot 2a (right direction in the illustrated embodiment). The third gate slot 2c extends from a rear end of the first gate slot 2a in the other direction perpendicular to the first gate slot 2a (left direction in the illustrated embodiment).

Beside the shift gate slot 2 on the escutcheon cover 3 are shown the following four symbols: "R", "N", "D" and "L" indicative of reverse, neutral, drive and low ranges, respectively, established as selectable options in the automatic transmission. It is to be understood that these symbols may be shown on the shift knob 4. Shift positions are arranged as shown in FIG. 3: a neutral position corresponding to the neutral range is located at the front end of the first gate slot 2a; a drive position corresponding to the drive range is located at a rear end of the first gate slot 2a; a reverse position corresponding to the reverse range is located at a right end of the second gate slot 2b; and a low position corresponding to the low range is located at a left end of the third gate slot 2c, whereas a home position 6 of the shift lever 5 is located at a central point of the first gate slot 2a.

The shift positions are classified by operation type of the shift lever 5 into one of a momentary position and a retention position. The momentary position is a shift position of a first type from which the shift lever 5 is allowed to automatically return to the home position 6 when the driver unclasps the shift lever 5. The retention position is a shift position of a second type in which the shift lever 5 is held even when the drive unclasps the shift lever 5. In this gearshift device 1, the neutral position and the drive position are configured as the momentary position, and the reverse position and the low position are configured as the retention position. A display unit 7 is provided in the escutcheon cover 3, as a light-emitting indicator to show the symbol of a currently actuated gear range. The display unit 7 may be provided in any location not limited to the escutcheon cover 3, for example, somewhere in the instrument panel IP near the gearshift device 1.

By allowing the shift lever 5 to be held in its position, as in the present embodiment, without always returning to the home position 6 as is the case where every shift position is configured as the momentary position, even when the driver unclasps the shift lever 5, if it is in one of a predetermined group of shift positions, such as the reverse position and the low position, the driver can easily recognize the current gear range as being the reverse range or the low range from the sensory feeling of his/her hand. Accordingly, the driver can make a quick and timely decision as to the manipulation of the shift lever 5 during parallel parking of the vehicle or driving through the hills. However, as described above, inconsistencies may take place such that when the driver gets off the vehicle with the shift lever 5 left in the reverse or low position, the status of the transmission is switched to the parking range though the shift lever 5 remains in the reverse or low position. In this instance, on the next occasion when the driver gets on the vehicle, the driver is undesirably obliged to manually move the shift lever 5 back to the home position 6 before anything else, as described above.

To attend to this problem, the gearshift device 1 according to the present embodiment is adapted to include a return mechanism 9 for causing the shift lever 5 held in the retention position to return to the home position 6, as shown in FIG. 2, on one of conditions that a parking switch 8 be turned on and that an ignition switch (not shown) be turned off. A controller 12 is provided to control the operation of the return mechanism 9. The parking switch 8 is, for example, of a push-button type, and provided frontward of the shift gate slot 2 on the escutcheon cover 3. When the vehicle is to be parked or to be placed likewise, the parking switch 8 is pressed to lock the automatic transmission into the "parking range". The parking switch 8 may also be provided, for example, on the shift knob 4 of the shift lever 5. The "parking range" may be unlocked by pressing the parking switch 8 once again, by pressing a brake pedal (not shown) or by other means.

Since the return mechanism 9 is provided, even when the driver gets off the vehicle with the shift lever 5 left in the retention position such as the reverse position or the low position, the shift lever 5 will return to the home position 6 by the time when the driver gets on the vehicle later, and thus the driver will not have to envisage the need for being concerned about the shift position of the shift lever 5 when he/she turns the ignition switch on. The gear range that is being actuated when the ignition switch is turned on with the shift lever 5 put in the home position 6 is the parking range or the neutral range.

Specific setups or configurations of the return mechanism 9 may vary and are not limited to a particular embodiment. Shown in FIG. 2 is an exemplified setup where the shift lever 5 held in the reverse or low position is pushed and moved to the neutral or drive position, respectively, using a solenoid 10 or 11 provided respectively near the reverse and low positions. Once the shift lever 5 is pressed and moved to the neutral or drive position, either of the momentary mechanisms (not shown) provided in the neutral and drive positions, respectively, causes the shift lever 5 to return to the home position 6.

In this or like embodiment, if turning-on operation of the parking switch 8 or turning-off operation of the ignition switch triggers operation of the return mechanism 9 and allows the shift lever 5 to return to the home position 6 immediately, i.e., in synchronization with the operation of one of these switches, some sensitive driver would possibly feel somewhat unexpected with such immediate return motion of the shift lever 5. Moreover, in cases where the parking switch 8 and/or the ignition switch are arranged in positions near the shift lever 5, or where the parking switch 8 is provided on the shift lever 5 itself, the immediately returning shift lever 5 could likely interfere with the hand operating the parking switch 8 or the ignition switch.

To these possible disadvantages, solutions may be furnished by the following alternative embodiments in which the shift lever 5 held in the retention position is adapted to start to return to the home position 6 at a time of expiration of a predetermined period or occurrence of a predetermined operation to the vehicle after the return mechanism is enabled so that the return motion of the shift lever 5 takes place at a time shifted from the time when the parking switch 8 or the ignition switch is operated. As a result, the problems of unexpected feeling of the driver and interference of the returning shift lever 5 with the operating driver's hand as described above can be avoided. The above "predetermined operation" is typified by the operation of opening and/or closing of a door of the vehicle (especially, the door at a driver's seat). In this instance, when the driver operates the parking switch 8 and/or the ignition switch and thereafter opens the door, gets off the vehicle through the door and closes the door, the driver's operation of opening and/or closing the door triggers the return mechanism 9 to cause the shift lever 5 to return to the home position 6. Thus, the shift lever 5 is caused to return to the home position 6 while the driver is getting off the vehicle, so that the aforementioned problem of unexpected feeling of the driver can be completely cleared up.

In the present embodiment, the neutral position and the drive position are each configured as the momentary position, and the reverse position and the low position are each configured as the retention position, while the neutral position and the drive position are located on a straight path (first gate slot 2a) of the shift lever 5 on which the home position 6 is located between the neutral position and the drive position, and the reverse position and the low position are located off the straight path (first gate slot 2a), i.e., on the second gate slot 2b and third gate slot 2c, respectively. Accordingly, the following advantageous effects can be achieved. First, the gearshift operation for switching between the most frequently used neutral and drive positions can be carried out straightforward, and thus the gearshift operation is facilitated. Further, since the home position 6 is located between these frequently used positions, the both positions can be recognized with increased ease. Moreover, since the less frequently used reverse and low positions in comparison with the neutral and drive positions are configured as the retention position and located off the straight path between the neutral and the drive positions, the driver can easily recognize the reverse and low positions through the sensory feeling of his/her hand.

Figure 4A:
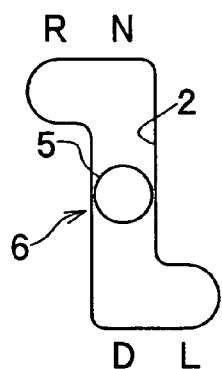
FIGS. 4A-4D are diagrammatic plan views illustrating modified examples of shifting patterns of a gearshift device.
Figure 4B:
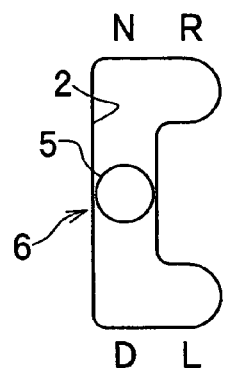
Figure 4C:
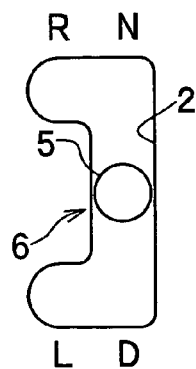
Figure 4D:
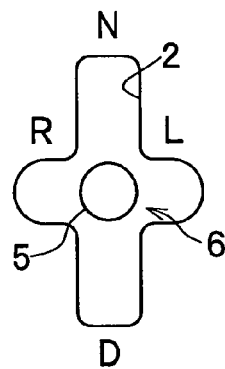

Referring now to FIGS. 4A-4D, modified examples of shifting patterns of the gear shift device according to exemplary embodiments of the present invention are illustrated. The illustrated shifting patterns are substantially the same as those shown in FIGS. 2 and 3 in that the neutral and drive positions are located on the straight path of the shift lever 5 on which the home position 6 is located between the neutral and drive positions and that the reverse and low positions are located off the straight path (more specifically, located respectively on paths perpendicular to the straight path). FIG. 4A shows a setup where the reverse position is located in a position shifted to the left from the neutral position, and the low position is located in a position shifted to the right from the drive position. FIG. 4B shows another setup where the reverse and low positions are located in positions shifted to the right from the neutral and drive positions, respectively. FIG. 4C shows still another setup where the reverse and low positions are located in positions shifted to the left from the neutral and drive positions, respectively. FIG. 4D shows still another setup where the low and reverse positions are located in positions shifted to the right and to the left, respectively, from the home position 6. With these shifting patterns as illustrated in FIGS. 4A-4D, the same advantageous effects as illustrated in FIGS. 2 and 3 can be achieved too.

In the gearshift device 1 as illustrated in FIGS. 2 and 3, the symbols shown in the display unit 7 may be indicated in different colors varying according to the current gear ranges (e.g., "D" corresponding to the drive range may be indicated in a green color, while "R" corresponding to the reverse range may be indicated in an orange color), so that the currently actuated gear range can be identified with improved ease. Alternatively, the escutcheon cover 3 itself may be adapted to serve as a light-emitting indicator (including a transmission-type escutcheon cover 3 that allows indication provided by the indicator at its back to show up on the cover 3) to show the current gear range in different colors.

Figure 5A:
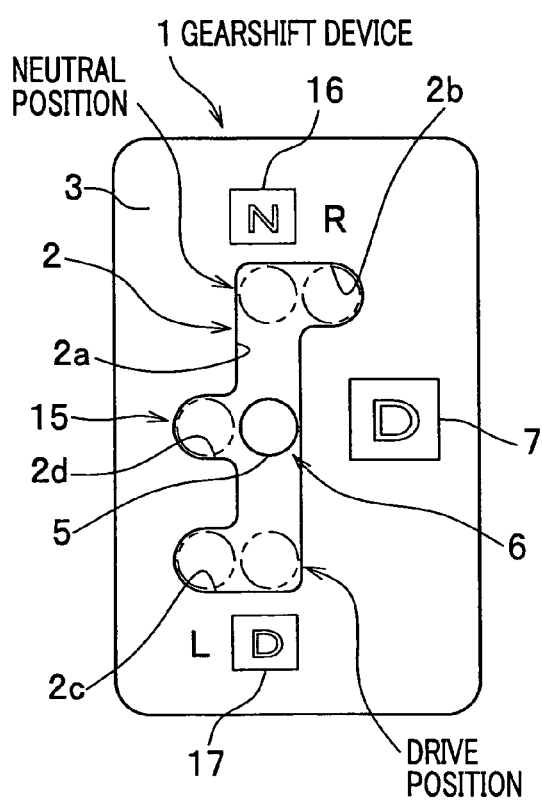
FIGS. 5A and 5B are diagrammatic plan views of a gearshift device for a semi-automatic transmission with manual speed changing functionality.
Figure 5B:
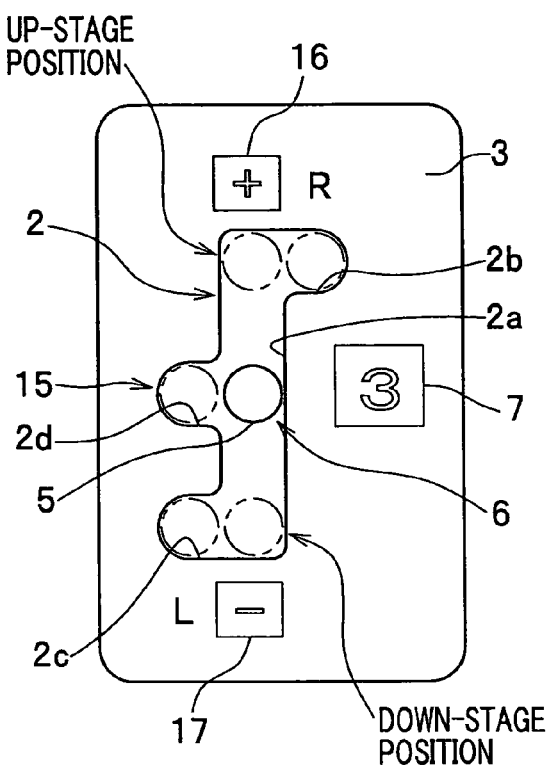

Turning to FIGS. 5A and 5B, another modified embodiment of gearshift device 1 according to the present invention will now be brought up for discussion, in which a driver is provided with an option of a manual mode for selecting a desired speed stage at will. As in the above-described embodiment of the gearshift device 1 shown in FIGS. 2 and 3, the front end, middle and rear end of the first gate slot 2a correspond to the neutral position, the home position 6 and the drive position, respectively, and the right end of the second gate slot 2b corresponds to the reverse position and the left end of the third gate slot 2c corresponds to the low position, whereas the neutral and drive positions are each configured as the momentary position and the reverse and low positions are each configured as the retention position. In this modified embodiment, a fourth gate slot 2d perpendicular to the first gate slot 2a is provided on one side (e.g., left side as illustrated) of the home position 6, and at the end of the fourth gate slot 2d is provided a mode switch position 15 for switching an automatic mode and a manual mode. The mode switch position 15 is configured as the momentary position. Further provided on the escutcheon cover 3 near the neutral and drive positions, respectively, are display units 16, 17 serving as light-emitting indicators to show different symbols depending upon whether the current operation mode is the automatic mode or the manual mode.

FIG. 5A shows the automatic mode, in which "N" is indicated in the display unit 16 to show that the front end of the first gate slot 2a is now configured as the neutral position, and the "D" is indicated in the display unit 17 to show that the rear end of the first gate slot 2a is now configured as the drive position. The display unit 7 now shows the currently actuated gear range. Once the driver operating in the state of indicators illustrated in FIG. 5A sets the shift lever 5 into the mode switch position 15, the operation mode is switched into the manual mode as illustrated in FIG. 5B. Since the mode switch position 15 is configured as the momentary position, the shift lever 5 automatically returns to the home position 6 as soon as the driver unclasps the shift lever 5.

In this modified embodiment, the first gate slot 2a is utilized as a shift gate slot for shifting the speed stages in the manual mode, and the neutral and drive positions in the automatic mode are configured to serve as up-stage and down-stage positions, respectively, in the manual mode. Hereupon, the display unit 16 indicates "+" showing that the front end of the first gate slot 2a is now configured as the up-stage position, while the display unit 17 indicates "−" showing that the rear end of the first gate slot 2a is now configured as the down-stage position. The display unit 7 indicates the speed stage of the currently actuated gear. The operation mode is switched from the manual mode to the automatic mode as illustrated in FIG. 5A, when the shift lever 5 is momentarily set into the mode switch position 15. In this embodiment, the shifting path of the shift lever 5 in the automatic mode doubles as the shifting path employed in the manual mode, which makes it possible to achieve a simplified structure and thus a compact body of the device.

Figure 6:
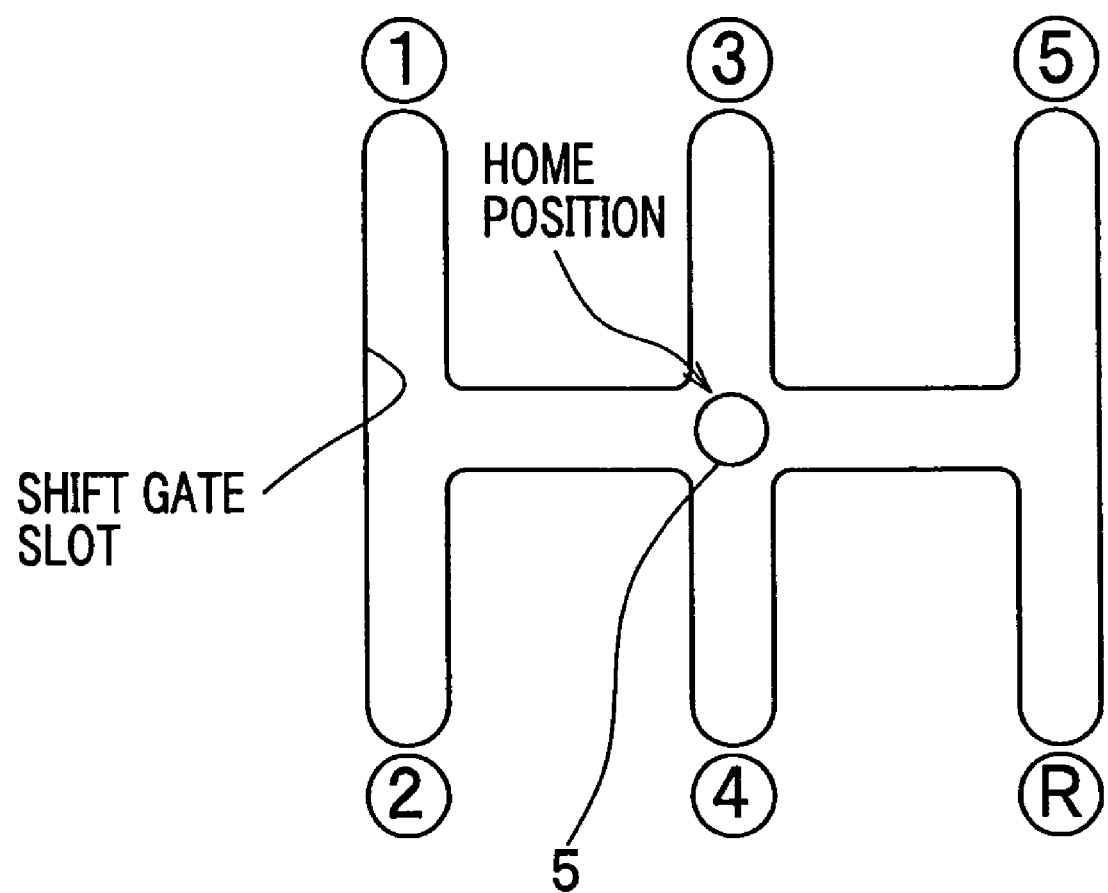
FIG. 6 is a diagrammatic plan view illustrating a shifting pattern of a gearshift device for a manual transmission.

Although some preferred embodiments of the present invention have been described above; it is however contemplated that numerous modifications may be made to those exemplary embodiments of the invention without departing from the spirit and scope of the embodiments of the present invention as defined in the following claims. For example, the present invention may be applied, by making use of part of the above-described embodiment, to a gearshift device for a manual transmission in which gears are changed manually. FIG. 6 shows a most prevailing shifting pattern of a five-stage type gearshift device, in which so-called H-type shift gate slots are provided and a home position (neutral position) of the shift lever 5 is located in a central position of the gate slots. In the typical gearshift device for the manual transmission, the shift lever 5 that may be set by the driver in one of shift positions corresponding to gear stages is held in the position the driver last sets until the driver manually shifts the shift lever 5 into another shift position. On the other hand, the gearshift device may be provided with a return mechanism for causing the shift lever 5 held in one gear stage to a home position on condition that an ignition switch be turned off, according to one embodiment of the present invention. In this embodiment, even if the driver gets off the vehicle with the shift lever 5 left in one of the shift positions corresponding to the gear stages the driver last selected, the shift lever 5 is in the home position when the driver turns the ignition switch on next time, and thus the driver will not have to be concerned about the shift position of the shift lever 5. It is to be understood that the return mechanism applicable to the present embodiment is not limited to a particular means known in the art, and may typically include a solenoid, a motor, or the like.

Furthermore, in this gearshift device for a manual transmission, as well, the return mechanism may be adapted to start to cause the shift lever 5 held in the gear stage to return to the home position at a time of expiration of a predetermined period or occurrence of a predetermined operation to the vehicle after the return mechanism is enabled by turning off the ignition switch. In this setup, the return motion of the shift lever 5 can be shifted in time from the turning-off operation of the ignition switch. Accordingly, the problem of unexpected feeling of the driver as described above can be avoided. The problem of interference of the returning shift lever 5 with the driver's hand operating the ignition switch, which would possibly be associated with the case where the ignition switch is provided near the position in which the shift lever 5 is provided, can also be avoided. The above "predetermined operation to the vehicle" may include opening and/or closing a door of the vehicle (especially the door at the driver's seat), and the like, as described above.

What is claimed is:

1. A gearshift device for an automatic transmission having a plurality of operation ranges, comprising:
   a shift lever initially positioned at a home position that is a default position, the shift lever being shifted by a driver from the home position to any of a plurality of shift lever positions to select at least one of the plurality of the operation ranges, the plurality of the shift lever positions each of which corresponds to one of the plurality of the operation ranges including a first operation range and a second operation range, the plurality of the shift lever positions including a momentary position corresponding to the first operation range, the momentary position from which the shift lever shifts back to the home position without the shift lever being shifted by the driver after the first operation range is selected, and a retention position being different from the momentary position and corresponding to the second operation range different from the first operation range, the retention position at which the shift lever is retained with the second operation range selected;
   a parking switch for selecting a parking range; and
   a shift lever return mechanism and a controller to control the shift lever mechanism to return the shift lever retained at the retention position to the home position without the shift lever being shifted by the driver when the parking switch is turned on or when an ignition switch is turned off.

2. A gearshift device according to claim 1, wherein the plurality of shift positions include a reverse position corresponding to a reverse range and a low position corresponding to a low range, and at least one of the reverse position and the low position is configured as the retention position.

3. A gearshift device according to claim 1, wherein the plurality of shift positions include a neutral position corresponding to a neutral range, a drive position corresponding to a drive range, a reverse position corresponding to a reverse range and a low position corresponding to a low range; the neutral position and the drive position are each configured as the momentary position, and the reverse position and the low position are each configured as the retention position; and wherein the neutral position and the drive position are located on a straight path of the shift lever on which the home position is located between the neutral position and the drive position, and the reverse position and the low position are located off the straight path.

4. A gearshift device according to claim 3, wherein the plurality of shift positions further include a mode switch position allowing an option to change an operation mode between an automatic mode and a manual mode, and the mode switch position is configured as the momentary position, and wherein the neutral and drive positions in the automatic mode corresponding to the neutral and drive ranges respectively serve as up-stage and down-stage positions in the manual mode.

5. A gearshift device according to claim 4 further comprising display units provided near the neutral and drive positions respectively to show functions of respective positions varying in accordance with the operation mode.

6. A gearshift device according to claim 1, wherein the return mechanism starts to cause the shift lever held in the retention position to return to the home position at a time of expiration of a predetermined period after the return mechanism is enabled.

7. A gearshift device according to claim 1, wherein the return mechanism starts to cause the shift lever held in the retention position to return to the home position at a time of occurrence of a predetermined operation to the vehicle after the return mechanism is enabled.

8. A gearshift device according to claim 7, wherein the predetermined operation to the vehicle includes at least one of opening and closing of a door at a driver's seat.

9. A gearshift device according to claim 1, wherein the return mechanism includes a solenoid.

10. A gearshift device according to claim 1, wherein the plurality of shift positions include a mode switch position allowing an option to change an operation mode between an automatic mode and a manual mode, and the mode switch position is configured as the momentary position.

* * * * *